(12) United States Patent
Lin

(10) Patent No.: US 10,051,443 B2
(45) Date of Patent: Aug. 14, 2018

(54) TRUNKING COMMUNICATION SERVICE PROCESSING METHOD, CORE NETWORK DEVICE, UE AND STORAGE MEDIUM

(71) Applicant: ZTE CORPORATION, Shenzhen, Guangdong Province (CN)

(72) Inventor: Yan Lin, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/322,455

(22) PCT Filed: Oct. 29, 2014

(86) PCT No.: PCT/CN2014/089832
§ 371 (c)(1),
(2) Date: Mar. 28, 2017

(87) PCT Pub. No.: WO2016/000367
PCT Pub. Date: Jan. 7, 2016

(65) Prior Publication Data
US 2017/0295474 A1 Oct. 12, 2017

(30) Foreign Application Priority Data
Jun. 30, 2014 (CN) .......................... 2014 1 0307291

(51) Int. Cl.
| | |
|---|---|
| H04W 4/10 | (2009.01) |
| H04W 76/00 | (2018.01) |
| H04W 68/00 | (2009.01) |
| H04W 76/40 | (2018.01) |
| H04W 88/02 | (2009.01) |
| H04W 84/08 | (2009.01) |

(52) U.S. Cl.
CPC .............. *H04W 4/10* (2013.01); *H04W 68/00* (2013.01); *H04W 76/002* (2013.01);
(Continued)

(58) Field of Classification Search
CPC ....... H04W 4/10; H04W 84/08; H04W 68/00; H04W 76/02
(Continued)

(56) References Cited

U.S. PATENT DOCUMENTS

| 6,134,433 A * | 10/2000 | Joong ..................... H04M 3/54 379/211.02 |
| 2004/0196810 A1 * | 10/2004 | Kil .......................... H04W 8/04 370/331 |

(Continued)

FOREIGN PATENT DOCUMENTS

| CN | 101022483 A | 8/2007 |
| CN | 101080041 A | 11/2007 |

(Continued)

*Primary Examiner* — Keith Ferguson
(74) *Attorney, Agent, or Firm* — Ling Wu; Stephen Yang; Ling and Yang Intellectual Property

(57) ABSTRACT

The present disclosure discloses a method for processing a trunking communication service. The method includes the following steps that: a user equipment receives a trunking communication service request message sent by a trunking core network device, the trunking communication service request message including a service type identifier (101); and the user equipment determines whether to receive the trunking communication service according to the service type identifier (102). The present disclosure also discloses another method for processing a trunking communication service, core network device, user equipment and a storage medium.

17 Claims, 3 Drawing Sheets

(52) U.S. Cl.
CPC ............ *H04W 76/40* (2018.02); *H04W 84/08* (2013.01); *H04W 88/02* (2013.01)

(58) Field of Classification Search
USPC ......... 455/518, 519, 404.1, 404.2, 458, 445, 455/550.01, 414.1–414.4, 403, 422.1, 455/417, 416, 426.1, 426.2, 509, 450, 455/566, 512; 370/310, 260, 261, 262, 370/328, 329, 312
See application file for complete search history.

(56) References Cited

U.S. PATENT DOCUMENTS

2015/0078231 A1* 3/2015 Bergstrom ........ H04W 72/1242 370/311

2015/0229677 A1 8/2015 Gu et al.

FOREIGN PATENT DOCUMENTS

| | | |
|---|---|---|
| CN | 101106743 A | 1/2008 |
| CN | 101400022 A | 4/2009 |
| CN | 101567842 A | 10/2009 |
| CN | 102035864 A | 4/2011 |
| CN | 102118682 A | 7/2011 |
| CN | 102711054 A | 10/2012 |
| EP | 2066135 A1 | 6/2009 |
| EP | 2830337 A1 | 1/2015 |
| EP | 2887708 A1 | 6/2015 |
| KR | 100656485 B1 | 12/2006 |
| KR | 20110030691 A | 3/2011 |

* cited by examiner

TRUNKING COMMUNICATION SERVICE PROCESSING METHOD, CORE NETWORK DEVICE, UE AND STORAGE MEDIUM

TECHNICAL FIELD

The present disclosure relates to a mobile communication technology, and more particularly to a method for processing a trunking communication service, core network device, User Equipment (UE) and a storage medium.

BACKGROUND

A trunking communication service refers to a dedicated trunking communication service such as commanding and dispatching provided for multiple group users of a department, a unit and the like by virtue of a trunking communication shared network formed by trunking communication systems with technical characteristics of channel sharing, dynamic allocation and the like. Along with continuous development of the communication network, a trunking communication system will provide increasingly rich trunking communication services. At present, there are two common trunking communication services: one is a call service, such as a Push To Talk (PTT) group call service; and the other is a non-call service, such as short message, picture, positioning, remote stopping, remote starting and PTT information updating services.

In a trunking communication service, the user equipment which actively initiates a trunking communication service request has a speaking right, and is regarded as a speaking the user equipment, and other the user equipments which receive the trunking communication service request are regarded as non-speaking the user equipments. Specifically, the speaking the user equipment sends a trunking communication service request message to trunking core network device through an uplink control channel, the trunking core network device analyzes the trunking communication service request message, and determines a service type and a group identifier according to a content (such as a call type and a call attribute, etc) carried in the trunking communication service request message. And the trunking core network device generates a paging message according to the group identifier, and sends it to a base station, the base station sends the paging message to the non-speaking the user equipment through a paging channel. The non-speaking the user equipment analyzes the paging message after receiving the paging message, matches the group identifier, and returns a paging response in case of successful matching. The base station allocates a downlink shared channel resource for a group call, establishes a downlink shared channel to transmit downlink data, and sends shared channel resource information to a group user through a control channel. The non-speaking user starts receiving the data on the downlink shared channel for trunking communication service after receiving a control channel message.

On one hand, in a group call service during trunking communication, for a the user equipment which has established a connection with trunking core network device, such as group call speaking the user equipment, when other the user equipment initiates another trunking communication service to the user equipment, the trunking core network device analyzes a trunking communication service request message sent by the other the user equipment to determine a type of the trunking communication service. And if the trunking communication service is a call service, the user equipment is controlled to quit a current call service and access the new call service, or the user equipment is controlled to keep the current call service and reject the new call service. And if it is a non-call service, the user equipment is controlled to keep the current call service and receive the non-call service. However, for a the user equipment which does not establish a connection with the trunking core network device, such as group call non-speaking the user equipment, the user equipment does not directly establish the connection with the trunking core network device, which makes it impossible for the trunking core network device to determine whether the user equipment is currently answering a group call or not, so that the trunking core network device may not control the user equipment to access or reject the new trunking communication service.

On the other hand, no matter whether a trunking communication service request message sent to trunking core network device by speaking the user equipment is a call service or a non-call service, the trunking core network device sends a paging message carrying a group identifier to a base station for sending to non-speaking the user equipment through the base station after receiving the trunking communication service request message, and the non-speaking the user equipment does not know whether a call service or a non-call service is received after receiving the paging message.

SUMMARY

In view of this, embodiments of the present disclosure are intended to provide a method for processing a trunking communication service, core network device, a user equipment and a storage medium, which are adopted to overcome a shortcoming of a trunking core network for the trunking communication service in a existing technology.

The technical solutions of the embodiments of the present disclosure are implemented as follows.

On a first aspect, an embodiment of the present disclosure provides a method for processing a trunking communication service, the method including that:

a user equipment receives a trunking communication service request message sent by a trunking core network device, herein the trunking communication service request message includes a service type identifier; and the user equipment determines whether to receive the trunking communication service according to the service type identifier.

In an embodiment of the present disclosure, the trunking communication service request message is a paging message including the service type identifier.

In an embodiment of the present disclosure, the service type identifier is a service identifier corresponding to a non-call service; and correspondingly, the step that the user equipment determines whether to receive the trunking communication service according to the service type identifier includes that:

the user equipment keeps a current group call service in progress and receives the non-call service.

In an embodiment of the present disclosure, the service type identifier is a service identifier corresponding to a call service; and correspondingly, the step that the user equipment determines whether to receive the trunking communication service according to the service type identifier includes that:

the user equipment keeps the current group call service in progress and rejects a new call service; or, the user equipment terminates the current group call service in progress and accesses the new call service; or, the user equipment selects whether to keep the current group call service in progress and reject the new call service or terminate the current group call service in progress and access the new call service according to a displayed prompting message.

In an embodiment of the present disclosure, the trunking communication service request message also includes a priority corresponding to the new call service; and Correspondingly, before the step that the user equipment keeps the current group call service in progress and rejects the new call service, the method also includes that:

the user equipment compares a priority corresponding to the current group call service in progress with the priority corresponding to the new call service, and determines that the priority of the current group call service in progress is higher than the priority of the new call service;

or, before the step that the user equipment terminates the current group call service in progress and accesses the new call service, the method also includes that:

the user equipment compares the priority corresponding to the current group call service in progress with the priority corresponding to the new call service, and determines that the priority of the current group call service in progress is lower than the priority of the new call service.

In an embodiment of the present disclosure, the call service is one of following services: a group call service and a single call service.

On a second aspect, an embodiment of the present disclosure also provides a user equipment, the user equipment including:

a first receiving module, arranged to receive a trunking communication service request message sent by a trunking core network device, herein the trunking communication service request message includes a service type identifier; and a determination module, arranged to determine whether to receive the trunking communication service according to the service type identifier.

In an embodiment of the present disclosure, the trunking communication service request message is a paging message including the service type identifier.

In an embodiment of the present disclosure, the service type identifier is a service identifier corresponding to a non-call service; and correspondingly, the determination module is arranged to keep a current group call service in progress and receive the non-call service.

In an embodiment of the present disclosure, the service type identifier is a service identifier corresponding to a call service; and correspondingly, the determination module is arranged to keep the current group call service in progress and reject a new call service; or, terminate the current group call service in progress and access the new call service; or, display a prompting message, herein the prompting message is used for prompting a user of selecting whether to keep the current group call service in progress and reject the new call service or terminate the current group call service in progress and access the new call service.

In an embodiment of the present disclosure, the trunking communication service request message also includes a priority corresponding to the new call service;

correspondingly, the user equipment also includes a comparison module; and the comparison module is arranged to, before the determination module keeps the current group call service in progress and rejects the new call service, compare a priority corresponding to the current group call service in progress with the priority corresponding to the new call service, and determine that the priority of the current group call service in progress is higher than the priority of the new call service, or, the comparison module is arranged to, before the determination module terminates the current group call service in progress and accesses the new call service, compare the priority corresponding to the current group call service in progress with the priority corresponding to the new call service, and determine that the priority of the current group call service in progress is lower than the priority of the new call service.

In an embodiment of the present disclosure, the call service is one of following services: a group call service and a single call service.

On a third aspect, an embodiment of the present disclosure also provides a method for processing a trunking communication service, the method including that:

a trunking core network device receives another trunking communication service request message including a service type identifier which is sent by another user equipment; and the trunking core network device sends the trunking communication service request message including the service type identifier to a user equipment, herein the service type identifier is used to enable the user equipment to determine whether to receive the trunking communication service.

In an embodiment of the present disclosure, the step that the trunking core network device sends the trunking communication service request message including the service type identifier to a user equipment includes that:

the trunking core network device forwards the received trunking communication service request message including the service type identifier to the user equipment;

or, the trunking core network device analyzes the trunking communication service request message to obtain the service identifier, adds the service identifier into a corresponding paging message, generates a paging message including the service type identifier, and sends the generated paging message including the service type identifier to the user equipment.

On a fourth aspect, an embodiment of the present disclosure provides a trunking core network device, the trunking core network device including:

a second receiving module, arranged to receive another trunking communication service request message including a service type identifier which is sent by another user equipment; and a sending module, arranged to send the trunking communication service request message including the service type identifier to a user equipment, herein the service type identifier is used to enable the user equipment to determine whether to receive the trunking communication service.

In an embodiment of the present disclosure, the sending module is arranged to forward the received trunking communication service request message including the service type identifier to the user equipment;

or, the trunking core network device includes: a generation module, arranged to analyze the trunking communication service request message to obtain a service identifier, add the service identifier into a corresponding paging message, generate a paging message including the service type identifier, and send the generated paging message including the service type identifier to the user equipment.

On a fifth aspect, an embodiment of the present disclosure also provides a computer storage medium, a computer-executable instruction is stored in the computer storage medium, and the computer-executable instruction is used for executing the abovementioned method for processing the trunking communication service provided by the embodiment on the first aspect; or, the computer-executable instruction is used for executing the abovementioned method for processing the trunking communication service provided by the embodiment on the third aspect.

According to the method for processing the trunking communication service, core network device, user equipment and storage medium provided by the embodiments of the present disclosure, the user equipment receives a trunking communication service request which is sent by the trunking core network device and carries the service type identifier, and then the user equipment may determine whether to receive the trunking communication service according to the service type identifier. In such a manner, non-speaking user equipment which does not establish a connection with the trunking core network device in the group call service may determine whether to receive a new trunking communication service by itself according to the service type identifier, so that the problem in the existing technology that the trunking core network device may not control the user equipment to access or reject the new trunking communication service due to the fact that the user equipment does not establish the connection with the trunking core network device is solved.

In addition, according to embodiment 1 of the present disclosure, the service type identifier is added into the trunking communication service request received by the user equipment, and then the non-speaking user equipment may know a type of the trunking communication service received by itself, and may independently determine whether to receive the trunking communication service according to a practical condition, so that the problem in the existing technology that the non-speaking user equipment does not know whether a call service or a non-call service is received after receiving the paging message is solved.

SPECIFIC EMBODIMENTS

Embodiment 1

Figure 1:
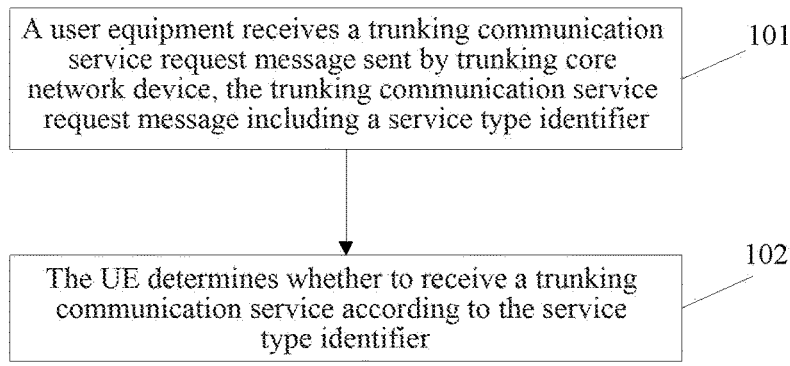
FIG. 1 is a basic flowchart of a method for processing a trunking communication service according to embodiment 1 of the present disclosure.

FIG. 1 is a basic flowchart of a method for processing a trunking communication service according to embodiment 1 of the present disclosure. As shown in FIG. 1, the method includes the following steps.

In step 101: a user equipment receives a trunking communication service request message sent by trunking core network device, the trunking communication service request message including a service type identifier.

Herein, the user equipment is a terminal equipment in a current group call service in progress.

It is important to note that the user equipment mentioned here may be various kinds of terminal equipments supporting the trunking communication service. And for example, the terminal equipment may be a handheld intelligent terminal equipment, including a laptop, a mobile phone like Iphone, a tablet computer like Ipad and the like, and may also be fixed terminal equipment, including a computer and the like.

Specifically, the user equipment mentioned here is terminal equipment in the current group call service in progress, may be non-speaking user equipment, and may also be speaking user equipment.

When the current group call service is established, a speaking user equipment establishes a connection with the trunking core network device; the speaking UE sends a current group call service request message to the trunking core network device. And the trunking core network device sends a paging message to a base station after receiving the current group call service request message. Then the base station sends the paging message to non-speaking user equipment through a paging channel, and establishes a downlink shared channel resource to enable the non-speaking user equipment to receive the paging message and receive group call downlink data on a downlink shared channel to perform the current group call service.

When another user equipment initiates another trunking communication service request message to the user equipment in the current group call service in progress, the trunking core network device analyzes the trunking communication service request message to obtain a service identifier corresponding to a trunking communication service after receiving the trunking communication service request message, adds a service type identifier into a paging message to obtain a trunking communication service request message including the service type identifier according to a service type corresponding to the service identifier, or generates the trunking communication service request message including the service type identifier according to the service type corresponding to the service identifier, and sends the trunking communication service request message including the service type identifier to the base station. Then the base station sends the trunking communication service request message to the user equipment in the current group call service in progress through a second downlink shared channel established by initiating another trunking communication service request by another UE. Here, another UE may be any user equipment except the user equipment in the current group call service in progress.

It is important to note that the service type identifier in the embodiment of the present disclosure may be a field added in an existing paging message to distinguish the type of the trunking communication service. For example: if the trunking communication service is a call service, a specific identifier, such as 0, is added to the field to represent that the trunking communication service is a call service; and if the trunking communication service is a non-call service, another specific identifier, such as 1, is added to the field to represent that the trunking communication service is a non-call service.

For an identifier of the field, abovementioned 0 and 1 are only adopted as examples for description. During a practical application, another symbol, such as an English letter, etc, may also be adopted, which is not specifically limited herein. In addition, a position of the field in a data packet may be set according to a practical condition, and for example: the field may be in a header of the data packet, may also be in an end of the data packet, and the like, which is also not specifically limited herein.

In step 102: the user equipment determines whether to receive the trunking communication service according to the service type identifier.

Specifically, the trunking communication service includes a call service and a non-call service, and the call service further includes a group call or a single call. For a trunking communication technology, a user equipment in a current group call service in progress is not allowed to perform another call service at the same time. For example, the user equipment may not answer two paths of video group calls at the same time. Then, if there is another call request for the user equipment, it is necessary to make a decision about whether to receive the call request or reject the call request. Therefore, it is necessary to determine a specific type of the trunking communication service request initiated to the user equipment by another user equipment, and in the embodiment of the present disclosure, the service type identifier is carried in the trunking communication service request to solve that problem.

When the service type identifier included in the trunking communication service request message is a service identifier corresponding to a non-call service, since a non-call service and a call service may be performed at the same time, the user equipment may keep the current group call service in progress and receive the non-call service.

When the service type identifier included in the trunking communication service request message is a service identifier corresponding to a group call service, since two call services may not be performed at the same time during trunking communication, the user equipment may select to keep the current group call service in progress and reject the new call service, may also terminate the current group call service in progress and access the new call service, and may further display a prompting message used for prompting a user and enable the user to select whether to keep the current group call service in progress and reject the new call service or terminate the current group call service in progress and access the new call service.

Figure 2:
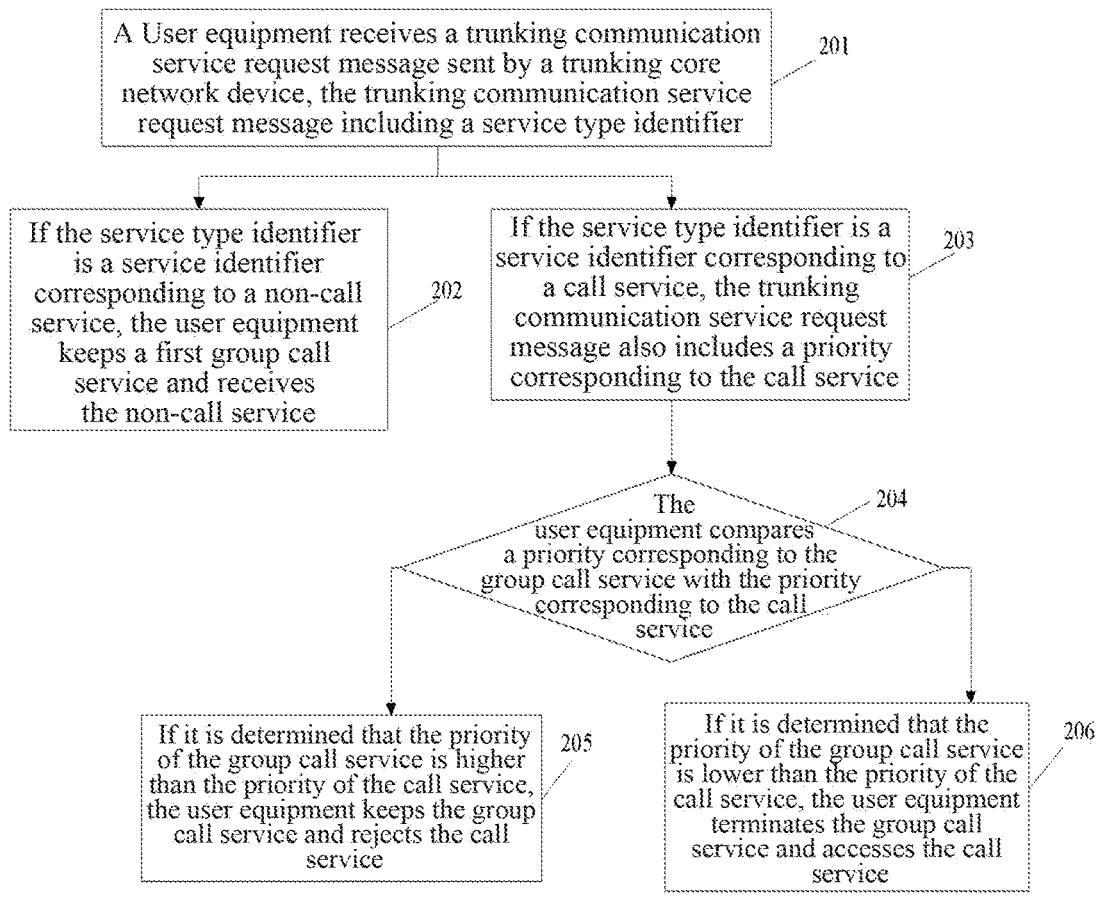
FIG. 2 is a detailed flowchart of a method for processing a trunking communication service according to embodiment 1 of the present disclosure.

FIG. 2 is a detailed flowchart of a method for processing a trunking communication service according to embodiment 1 of the present disclosure. As shown in FIG. 2, the method specifically includes the following steps.

In step 201: a user equipment receives a trunking communication service request message sent by a trunking core network device, the trunking communication service request message including a service type identifier.

Herein, the user equipment is a terminal equipment in a group call service in progress.

In step 202: if the service type identifier is a service identifier corresponding to a non-call service, the user equipment keeps a group call service and receives the non-call service, and the processing flow is ended.

In step 203: if the service type identifier is a service identifier corresponding to a call service, the trunking communication service request message also includes a priority corresponding to the call service.

It is important to note that a priority sequence of a group call service and a single call service is preset by the trunking core network device. For example, every time when a call service is established, the trunking core network device may set a priority for it according to an attribute, such as an emergency degree, of the call service.

Herein, the group call service and the call service are only adopted to distinguish different group call services, the group call service represents the current group call service in progress, and the call service represents a new group call service.

In step 204: the user equipment compares a priority corresponding to the group call service with the priority corresponding to the call service.

In step 205: if it is determined that the priority of the group call service is higher than the priority of the call service, the user equipment keeps the group call service and rejects the call service, and the processing flow is ended.

In step 206: if it is determined that the priority of the group call service is lower than the priority of the call service, the user equipment terminates the group call service and accesses the call service.

According to embodiment 1 of the present disclosure, the user equipment receives a trunking communication service request sent by the trunking core network device, the trunking communication service request includes the service type identifier. Then the user equipment may determine whether to receive the trunking communication service according to the service type identifier. In such a manner, non-speaking UE which does not establish a connection with the trunking core network device in the group call service may determine whether to receive a new trunking communication service by itself according to the service type identifier. Moreover, the solution of embodiment 1 of the present disclosure may also be used for speaking user equipment.

In addition, according to embodiment 1 of the present disclosure, the service type identifier is added into the trunking communication service request received by the user equipment, and then the non-speaking user equipment may know a type of the trunking communication service received by itself, and may independently determine whether to receive the trunking communication service or not according to a practical condition.

In order to implement the abovementioned method for processing the trunking communication service provided by embodiment 1 of the present disclosure, embodiment 1 of the present disclosure also provides a user equipment. The technical principle and achieved technical effects are similar to those of the abovementioned method for processing the trunking communication service provided by embodiment 1 of the present disclosure, and will not be elaborated herein. A structure of the user equipment provided by embodiment 1 of the present disclosure will be described below in detail.

Figure 3:
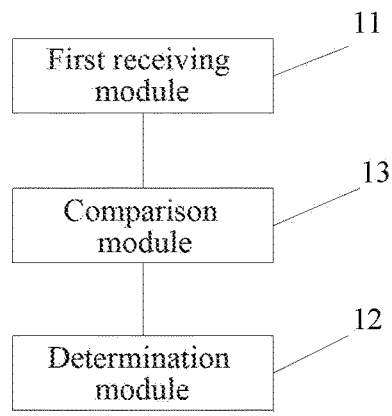
FIG. 3 is a structure diagram of a user equipment according to embodiment 1 of the present disclosure.

FIG. 3 is a structure diagram of a user equipment according to embodiment 1 of the present disclosure. As shown in FIG. 3, the user equipment includes: a first receiving module 11 and a determination module 12.

The first receiving module 11 is arranged to receive a trunking communication service request message sent by trunking core network device, the trunking communication service request message including a service type identifier.

Herein, the user equipment is a terminal equipment in a current group call service in progress.

The determination module 12 is arranged to determine whether to receive the trunking communication service according to the service type identifier.

Furthermore, the trunking communication service request message is a paging message including the service type identifier.

Furthermore, the service type identifier is a service identifier corresponding to a non-call service.

Correspondingly, the determination module 12 is arranged to keep the group call service and receive the non-call service.

Furthermore, the service type identifier is a service identifier corresponding to a call service.

Correspondingly, the determination module 12 is arranged to keep the current group call service in progress and reject the new call service; or, terminate the current group call service in progress and access the new call service; or, display a prompting message, the prompting message being arranged to prompt a user of selecting whether to keep the current group call service in progress and reject the new call service or terminate the current group call service in progress and access the new call service.

Furthermore, the trunking communication service request message also includes a priority corresponding to the new call service.

Correspondingly, the user equipment also includes: a comparison module 13, arranged to, before the determination module 12 keeps the current group call service in progress and rejects the new call service, compare a priority corresponding to the current group call service in progress with the priority corresponding to the new call service, and determine that the priority of the current group call service in progress is higher than the priority of the new call service.

Or, the comparison module 13 is arranged to, before the determination module 12 terminates the current group call service in progress and accesses the new call service, compare the priority corresponding to the current group call service in progress with the priority corresponding to the new call service, and determine that the priority of the current group call service in progress is lower than the priority of the new call service.

Furthermore, the call service includes a group call service and a single call service.

Embodiment 2

Figure 4:
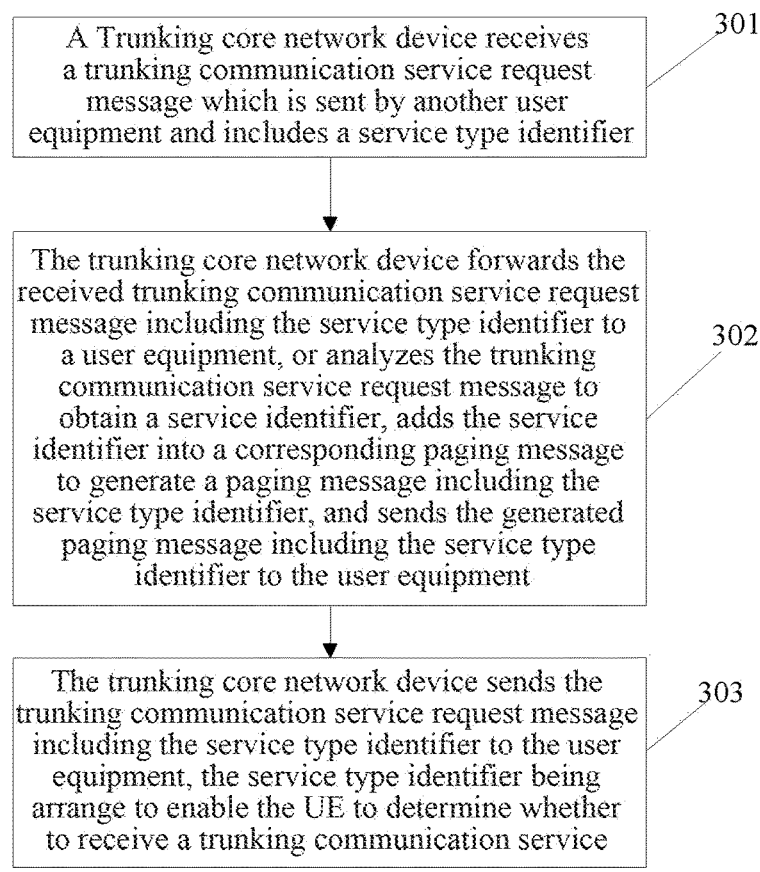
FIG. 4 is a flowchart of a method for processing a trunking communication service according to embodiment 2 of the present disclosure.

FIG. 4 is a flowchart of a method for processing a trunking communication service according to embodiment 2 of the present disclosure. As shown in FIG. 4, the method specifically includes the following steps.

In step 301: a trunking core network device receives a trunking communication service request message including a service type identifier which is sent by another user equipment.

It is important to note that anther user equipment mentioned here is a user equipment which initiates another group call service to a user equipment in a group call service in progress. Another user equipment may be any user equipment except the user equipment which participates in the group call service in progress.

In step 302: the trunking core network device forwards the received trunking communication service request message including the service type identifier to a user equipment, or analyzes the trunking communication service request message to obtain a service identifier, adds the service identifier into a corresponding paging message to generate a paging message including the service type identifier, and sends the generated paging message including the service type identifier to the user equipment.

Specifically, the trunking core network device adds the service type identifier into the paging message. When a service type is a non-call service type, the trunking core network device adds a service identifier corresponding to a non-call service into the paging message; and when the service type is a service type corresponding to a call service, the trunking core network device adds a service identifier corresponding to the call service into the paging message.

In step 303: the trunking core network device sends the trunking communication service request message including the service type identifier to the user equipment, herein the service type identifier is used to enable the user equipment to determine whether to receive the trunking communication service.

Herein, the user equipment is a terminal equipment in a current group call service in progress.

Specifically, when the service type identifier is a service identifier corresponding to a non-call service, the user equipment keeps the current group call service in progress and receives the non-call service; and when the service type identifier is a service identifier corresponding to a call service, the user equipment may select to keep the current group call service in progress and reject the new call service, may also terminate the current group call service in progress and access the new call service, and may further display a prompting message used for prompting a user and enable the user to select whether to keep the current group call service in progress and reject the new call service or terminate the current group call service in progress and access the new call service.

According to embodiment 2 of the present disclosure, the trunking core network device receives another trunking communication service request sent by another user equipment, adds the service type identifier into another trunking communication service request to obtain a trunking communication service request carrying the service type identifier, and sends the trunking communication service request carrying the service type identifier to the user equipment, and then the user equipment may determine whether to receive the trunking communication service according to the service type identifier. In such a manner, the non-speaking user equipment which does not establish a connection with the trunking core network device in the group call service may determine whether to receive a new trunking communication service or not by itself according to the service type identifier. Moreover, the solution of embodiment 2 of the present disclosure may also be used for speaking UE.

In order to implement the abovementioned method for processing the trunking communication service provided by embodiment 2 of the present disclosure, embodiment 2 of the present disclosure also provides a trunking core network device. The technical principle and achieved technical effects are similar to those of the abovementioned method for processing the trunking communication service provided by embodiment 2 of the present disclosure, and will not be elaborated herein. A structure of the trunking core network device provided by embodiment 2 of the present disclosure will be described below in detail.

Figure 5:
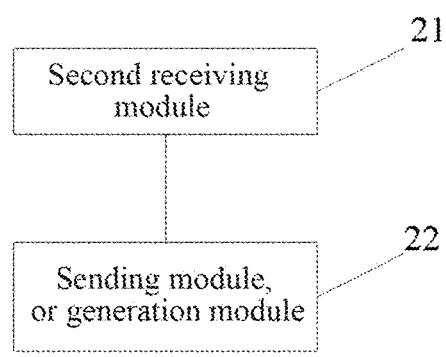
FIG. 5 is a structure diagram of a trunking core network device according to embodiment 2 of the present disclosure.

FIG. 5 is a structure diagram of a trunking core network device according to embodiment 2 of the present disclosure. As shown in FIG. 5, the trunking core network device includes: a second receiving module 21 and a sending module 22 or a generation module 22.

The second receiving module 21 is arranged to receive another trunking communication service request message including a service type identifier which is sent by another user equipment.

The sending module 22 is arranged to forward the received trunking communication service request message including the service type identifier to a user equipment.

Or, the trunking core network device includes: the generation module 22, arranged to analyze the trunking communication service request message to obtain a service identifier, add the service identifier into a corresponding paging message to generate a paging message including the service type identifier, and send the generated paging message including the service type identifier to the user equipment.

The first receiving module, determination module and comparison module in the user equipment provided by the embodiment of the present disclosure may all be implemented by a processor in the user equipment, while the second receiving module, sending module or generation module in the trunking core network device may all be implemented by a processor in the trunking core network device, and functions realized by the processors may certainly be realize by specific logic circuits. In specific processes of the embodiments, the processor may be a Central Processing Unit (CPU), a Micro Processing Unit (MPU), a Digital Signal Processor (DSP), or a Field-Programmable Gate Array (FPGA) or the like, and the abovementioned communication terminal may be equipment such as a mobile phone and a tablet computer.

It is important to note that: in the embodiment of the present disclosure, if being implemented in form of software function module and sold or used as an independent product, the abovementioned method for processing the trunking communication service may also be stored in a computer-readable storage medium. Based on such an understanding, the technical solutions of the embodiment of the present disclosure substantially or parts making contributions to the existing technology may be embodied in form of software product, and the computer software product is stored in a storage medium, including a plurality of instructions arranged to enable a piece of computer equipment (which may be a personal computer, a server, network equipment or the like) to execute all or part of the method in each embodiment of the present disclosure. The abovementioned storage medium includes: various media capable of storing program codes such as a U disk, a mobile hard disk, a Read-Only Memory (ROM), a magnetic disk or an optical disk. Therefore, the embodiment of the present disclosure is not limited to any specific hardware and software combination.

Correspondingly, an embodiment of the present disclosure also provides a computer storage medium, a computer-executable instruction is stored in the computer storage medium, and the computer-executable instruction is used for executing the method for processing the trunking communication service provided by each embodiment of the present disclosure.

In some embodiments provided by the present disclosure, it should be understood that the disclosed method and equipment may be implemented in another manner. The device embodiment described above is only schematic, and for example, division of the modules is only logic function division, and other division manners may be adopted during practical implementation. For example, multiple units or components may be combined or integrated into another system, or some characteristics may be neglected or not executed. In addition, communication connection between each displayed or discussed component may be indirect coupling or communication connection, implemented through some interfaces, of the equipment or the units, and may be electrical and mechanical or adopt other forms.

The abovementioned units described as separate parts may or may not be physically separated, and parts displayed as units may or may not be physical units, and namely may be located in the same place, or may also be distributed to multiple network units. Part or all of the units therein may be selected to achieve the purpose of the solutions of the embodiment according to a practical requirement.

In addition, each function unit in each embodiment of the present disclosure may be integrated into a processing unit, each unit may also exist independently, and two or more than two units may also be integrated into a unit. The abovementioned integrated unit may be implemented in a hardware form, and may also be implemented in form of hardware and software function unit.

Those skilled in the art should know that: all or part of the steps implementing the abovementioned method embodiment may be implemented by related hardware instructed by a program, the abovementioned program may be stored in a computer-readable storage medium, and when the program is executed, the steps of the abovementioned method embodiment are executed; and the abovementioned storage medium includes: various media capable of storing program codes such as a mobile storage equipment, a Read-Only Memory (ROM), a magnetic disk or an optical disk.

Or, if being implemented in form of software function module and sold or used as an independent product, the embodiment of the present disclosure may also be stored in a computer-readable storage medium. Based on such an understanding, the technical solutions of the embodiment of the present disclosure substantially or parts making contributions to the existing technology may be embodied in form of software product, and the computer software product is stored in a storage medium, including a plurality of instructions arranged to enable a piece of computer equipment (which may be a personal computer, a server, network equipment or the like) to execute all or part of the method in each embodiment of the present disclosure. The abovementioned storage medium includes: various media capable of storing program codes such as mobile storage equipment, a ROM, a magnetic disk or an optical disk.

The present disclosure only takes the abovementioned embodiments as example, but is not limited to them. Those skilled in the art should know that: the technical solutions recorded in each of the abovementioned embodiments may still be modified, or part or all of technical characteristics therein may be equivalently replaced; and those modifications or replacements are made with the essence of corresponding technical solutions not departing from the scope of the technical solutions of each embodiment of the present disclosure.

The above is only the alternative embodiment of the present disclosure and not intended to limit the scope of protection of the present disclosure.

INDUSTRIAL APPLICABILITY

In the embodiment of the present disclosure, the user equipment receives the trunking communication service request which is sent by the trunking core network device and carries the service type identifier, and then the user equipment may determine whether to receive the trunking communication service according to the service type identifier. In such a manner, the non-speaking user equipment which does not establish the connection with the trunking core network device in the group call service may determine whether to receive the new trunking communication service by itself according to the service type identifier, so that the problem in the existing technology that the trunking core network device may not control the user equipment to access or reject the new trunking communication service due to the fact that the user equipment does not establish the connection with the trunking core network device is solved.

What I claim is:

1. A method for processing trunking communication service, comprising:
 a user equipment receiving a trunking communication service request message sent by a trunking core network device, wherein the trunking communication service request message comprises a service type identifier; and
 the user equipment determining whether to receive the trunking communication service according to the service type identifier;
 wherein the service type identifier comprises a service identifier corresponding to a non-call service; and
 correspondingly, the user equipment determining whether to receive the trunking communication service according to the service type identifier comprises:
 the user equipment keeping a current group call service in progress and receiving the non-call service.

2. The method according to claim 1, wherein the trunking communication service request message is a paging message comprising the service type identifier.

3. The method according to claim 2, wherein the service type identifier comprises a service identifier corresponding to a call service; and
 correspondingly, the user equipment determining whether to receive the trunking communication service according to the service type identifier comprises:
 the user equipment keeping the current group call service in progress and rejecting a new call service; or,
 the user equipment terminating the current group call service in progress and accessing the new call service; or,
 the user equipment selecting whether to keep the current group call service in progress and reject the new call service or terminate the current group call service in progress and access the new call service according to a displayed prompting message.

4. The method according to claim 1, wherein the service type identifier comprises a service identifier corresponding to a call service; and
 correspondingly, the user equipment determining whether to receive the trunking communication service according to the service type identifier comprises:
 the user equipment keeping the current group call service in progress and rejecting a new call service; or,
 the user equipment terminating the current group call service in progress and accessing the new call service; or,
 the user equipment selecting whether to keep the current group call service in progress and reject the new call service or terminate the current group call service in progress and access the new call service according to a displayed prompting message.

5. The method according to claim 4, wherein the trunking communication service request message comprises a priority corresponding to the new call service; and
 correspondingly, before the user equipment keeping the current group call service in progress and rejecting the new call service, the method comprises:
 the user equipment comparing a priority corresponding to the current group call service in progress with the priority corresponding to the new call service, and determining that the priority of the current group call service in progress is higher than the priority of the new call service;
 or, before the user equipment terminating the current group call service in progress and accessing the new call service, the method comprises:
 the user equipment comparing the priority corresponding to the current group call in progress with the priority corresponding to the new call service, and determining that the priority of the current group call service in progress is lower than the priority of the new call service.

6. The method according to claim 5, wherein the call service is one of following services: a group call service and a single call service.

7. The method according to claim 4, wherein the call service is one of following services: a group call service and a single call service.

8. A non-transitory computer storage medium, storing a computer-executable instruction, wherein the computer-executable instruction is used for executing the method for processing the trunking communication service according to claim 1.

9. A User Equipment, comprising:
 a first receiving module, arranged to receive a trunking communication service request message sent by a trunking core network device, wherein the trunking communication service request message comprises a service type identifier; and
 a determination module, arranged to determine whether to receive the trunking communication service according to the service type identifier;
 wherein the service type identifier comprises a service identifier corresponding to a non-call service; and
 correspondingly, the determination module is arranged to keep a current group call service in progress and receive the non-call service.

10. The user equipment according to claim 9, wherein the trunking communication service request message is a paging message comprising the service type identifier.

11. The user equipment according to claim 10, wherein the service type identifier comprises a service identifier corresponding to a call service; and
 correspondingly, the determination module is arranged to keep the current group call service in progress and reject the new call service, or,
 the determination module is arranged to terminate the current group call service in progress and access the new call service, or,
 the determination module is arranged to display a prompting message, wherein the prompting message is used for prompting a user of selecting whether to keep the current group call service in progress and reject the new call service or terminate the current group call service in progress and access the new call service.

12. The user equipment according to claim 11, wherein the trunking communication service request message also comprises a priority corresponding to the new call service;
 correspondingly, the user equipment comprises a comparison module; and
 the comparison module is arranged to, before the determination module keeps the current group call service in progress and rejects the new call service, compare a priority corresponding to the current group call service in progress with the priority corresponding to the new call service, and determine that the priority of the current group call service in progress is higher than the priority of the new call service,
 or, the comparison module is arranged to, before the determination module terminates the current group call service in progress and accesses the new call service, compare the priority corresponding to the current group call in progress with the priority corresponding to the new call service, and determine that the priority of the current group call service in progress is lower than the priority of the new call service.

13. The user equipment according to claim 11, wherein the call service is one of following services: a group call service and a single call service.

14. A method for processing a trunking communication service, comprising:
  a trunking core network device receiving a trunking communication service request message comprising a service type identifier which is sent by a source user equipment; and
  the trunking core network device sending the trunking communication service request message comprising the service type identifier to a user equipment, wherein the service type identifier is used to enable the user equipment to determine whether to receive the trunking communication service;
  wherein the service type identifier comprises a service identifier corresponding to a non-call service.

15. The method according to claim 14, wherein trunking core network device sending the trunking communication service request message comprising the service type identifier to a user equipment comprises:
  the trunking core network device forwarding the received trunking communication service request message comprising the service type identifier to the user equipment;
  or, the trunking core network device analyzing the trunking communication service request message to obtain a service identifier, adding the service identifier into a corresponding paging message, generating a paging message comprising the service type identifier, and sending the generated paging message comprising the service type identifier to the user equipment.

16. A trunking core network device, comprising:
  a receiving module, arranged to receive a trunking communication service request message comprising a service type identifier which is sent by a source user equipment; and
  a sending module, arranged to send the trunking communication service request message comprising the service type identifier to a user equipment, wherein the service type identifier is used to enable the user equipment to determine whether to receive the trunking communication service;
  wherein the service type identifier comprises a service identifier corresponding to a non-call service.

17. The equipment according to claim 16, wherein the sending module is arranged to forward the received trunking communication service request message comprising the service type identifier to the user equipment;
  or,
  the trunking core network device comprises: a generation module, arranged to analyze the trunking communication service request message to obtain a service identifier, add the service identifier into a corresponding paging message, generate a paging message comprising the service type identifier, and send the generated paging message comprising the service type identifier to the user equipment.

* * * * *